(12) United States Patent
Donnelly et al.

(10) Patent No.: US 10,365,763 B2
(45) Date of Patent: Jul. 30, 2019

(54) SELECTIVE ATTENUATION OF SOUND FOR DISPLAY DEVICES

(71) Applicant: Microsoft Technology Licensing, LLC, Redmond, WA (US)

(72) Inventors: Sean M. Donnelly, Portland, OR (US); Jason D. Wilson, Wilsonville, OR (US); Denis Varlamov, Portland, OR (US); Eric Immel, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/097,878

(22) Filed: Apr. 13, 2016

(65) Prior Publication Data

US 2017/0300172 A1    Oct. 19, 2017

(51) Int. Cl.
*G06F 3/041* (2006.01)
*G06F 3/16* (2006.01)
*G06F 3/0488* (2013.01)

(52) U.S. Cl.
CPC .......... *G06F 3/0418* (2013.01); *G06F 3/0416* (2013.01); *G06F 3/0488* (2013.01); *G06F 3/165* (2013.01)

(58) Field of Classification Search
CPC ............... G06F 3/03545; G06F 3/0418; G06F 3/16–3/167; G10L 15/20; G10L 21/0208;
(Continued)

(56) References Cited

U.S. PATENT DOCUMENTS 5,930,372 A * 7/1999 Kuriyama ............. G06F 1/1626
381/71.14
6,343,519 B1   2/2002 Callicott et al.
(Continued)

FOREIGN PATENT DOCUMENTS

EP    1587064 A1   10/2005
WO   2006070044 A1  7/2006

OTHER PUBLICATIONS

Xia, et al., "Zero-Latency Tapping: Using Hover Information to Predict Touch Locations and Eliminate Touchdown Latency", In Proceedings of the 27th annual ACM symposium on User interface software and tehcnology, Oct. 5, 2014, pp. 205-214.
(Continued)

*Primary Examiner* — Xuemei Zheng
(74) *Attorney, Agent, or Firm* — Alleman Hall Creasman & Tuttle LLP

(57) ABSTRACT

A display device comprises a sensing subsystem configured to detect one or more conditions associated with touch input to the display device occurring via a contact of an input object at a surface of the display device. The display device further comprises a microphone system configured to receive sound, a logic machine, and a storage machine holding instructions. The instructions are executable by the logic machine to determine, based on the one or more conditions, a time of the contact; determine, based on at least the time of the contact, some characteristics of the contact; and generate an audio output via applying a selective attenuation to process sound received into the microphone system. The selective attenuation is selected based on the sonic characteristics and applied over a time interval beginning at the determined time of contact.

19 Claims, 9 Drawing Sheets

(58) Field of Classification Search
CPC ............ G10L 21/0232; G10K 2210/11; G10K 2210/115
See application file for complete search history.

(56) References Cited

U.S. PATENT DOCUMENTS

| | | |
|---|---|---|
| 8,027,743 B1 | 9/2011 | Johnston |
| 8,149,227 B2 | 4/2012 | Marggraff et al. |
| 8,213,635 B2 | 7/2012 | Li et al. |
| 8,284,951 B2 | 10/2012 | Van Schaack et al. |
| 8,775,171 B2 | 7/2014 | Sorensen et al. |
| 2005/0226505 A1* | 10/2005 | Wilson ................ G06F 3/0425 382/180 |
| 2008/0306733 A1 | 12/2008 | Ozawa |
| 2009/0122024 A1 | 5/2009 | Nakamura et al. |
| 2009/0195518 A1* | 8/2009 | Mattice ................ G06F 3/0416 345/177 |
| 2010/0260354 A1 | 10/2010 | Ozawa |
| 2011/0013785 A1 | 1/2011 | Kim |
| 2011/0136479 A1 | 6/2011 | Kim et al. |
| 2012/0109632 A1 | 5/2012 | Sugiura et al. |
| 2013/0257812 A1* | 10/2013 | Wang ................ G06F 3/043 345/175 |
| 2014/0022189 A1 | 1/2014 | Sheng et al. |
| 2014/0023210 A1 | 1/2014 | Sheng et al. |
| 2014/0327614 A1 | 11/2014 | Park |
| 2014/0331146 A1 | 11/2014 | Ronkainen et al. |

OTHER PUBLICATIONS

ISA European Patent Office, International Search Report and Written Opinion Issued in PCT Application No. PCT/US2017/026033, dated Jun. 30, 2017, WIPO, 14 Pages.

\* cited by examiner

SELECTIVE ATTENUATION OF SOUND FOR DISPLAY DEVICES

BACKGROUND

A user may manipulate various software/hardware components of a touch-sensitive display device by interacting with a surface of the display device using one or more input objects. Such input objects may include passive styluses, active styluses, human fingers, etc. Display devices may additionally include one or more microphones for capturing audio in a local environment of the display device. Such audio may be recorded, played via one or more internal/external speakers, and/or transmitted over a computer network. In some cases, microphones can pick up sound resulting from contact between a stylus or other input object and the surface of the display.

DETAILED DESCRIPTION

Figure 1:
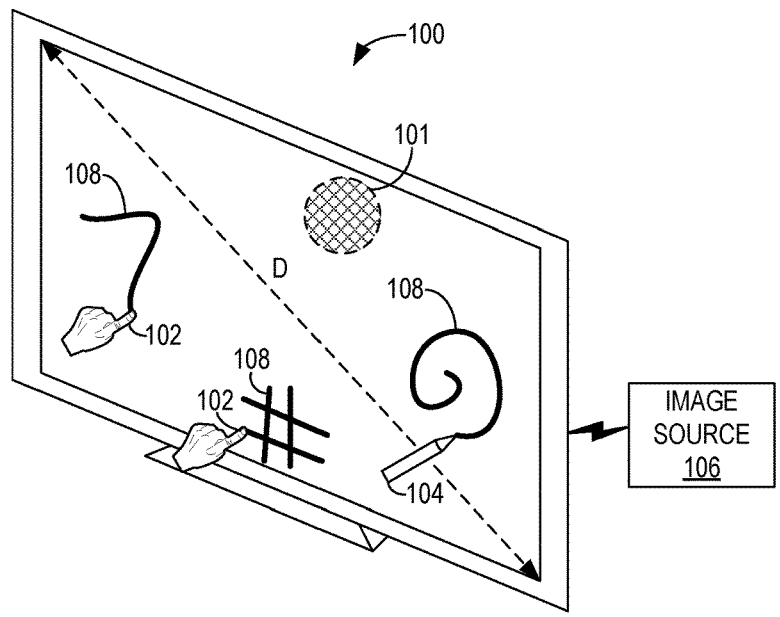
FIG. 1 depicts an example touch-sensitive display device.

The present discussion relates to reducing/minimizing unwanted sounds resulting from objects contacting the surface of a touch-sensitive display device. These sounds may be received into a microphone system associated with the touch-sensitive display, along with voices and other sounds near the display device. The received sound is then processed to generate audio output that can be presented to listeners in various ways and at various locations. Microphone-equipped display devices are used in a wide range of settings to record/transmit desirable sounds (e.g., human speech, music) occurring in the device's local environment. For example, a touch-sensitive display device may be used to record sound while a user attends a meeting or a class. Additionally or alternatively, a user may use a touch-sensitive display device to verbally communicate with users of other computing devices (e.g., desktop computers, laptop computers, mobile phones, tablet devices, set top boxes) over a computer network.

As indicated above, while the microphone system is receiving environmental sound (e.g., voices of participants in a conference room meeting), a user of the touch-sensitive display device may interact with the device through use of an input object, input objects may include various active styluses and passive styluses, as well as the user's fingers, though the sound-attenuation approaches discussed herein may be employed with any type of input object which comes into contact with the surface of a display de cc during the course of its use.

Contact between an input object and a surface of the display device may produce a tapping sound or other audible contact sound, which may be received by the microphone system and included in the audio output that ultimately is presented to a listener. Accordingly, the desired sound (e.g., conversation in a meeting) may be negatively impacted by contact sounds (e.g., tapping of stylus/finger on a display, sliding of a stylus/finger across a surface of the display) in the audio output. Such contact sounds may be merely distracting, or at worst may render the desirable sound inaudible. For example, in a classroom lecture, a common use case example would be a student taking notes with a stylus while recording the lecture. Such note taking would involve ongoing and frequent contact of the stylus with the input surface of the user's device. The resulting tapping sounds potentially could render the audio unusable.

Accordingly, the present disclosure contemplates a display device which is configured to receive, process, and output sound, where the processing includes selectively attenuating received sound to at least partially attenuate contact sounds produced by a stylus, finger, or other input object. The display device includes a sensing subsystem configured to detect one or more conditions associated with touch inputs of a stylus or other input object. The detected conditions are used in various ways to control selective attenuation within the microphone system to reduce/eliminate the unwanted contact sounds. In some examples, the detected conditions are used to predict a time at which contact will occur, and to use a tailored attenuation that begins at the time of contact. Typically, it will be desirable that the attenuation be as time-limited as possible, i.e., beginning at the time of contact and lasting only as long as the contact sound would negatively affect the audio experience.

FIG. 1 shows a touch sensitive display device 100 including a touch sensor 101. In some examples, display device 100 may be a large-format display device with a diagonal dimension D greater than 1 meter, for example, though the display may assume any suitable size. For example, displays similar to display 100 may be used with smartphones, tablets, laptop computers, convertible computers, and/or any other computing devices. Display device 100 may be configured to detect touch input between a surface of the display device and one or more input objects, such as touch input imparted via a digit 102 of a user and/or input supplied by an input object 104, shown in FIG. 1 as a stylus. Digit 102 and input device 104 are provided as non-limiting examples and any other suitable input objects may be used in connection with display device 100. Display device 100 may be configured to receive input from input objects in contact with the display device 100. Additionally, display device 100 may be configured to receive input from input objects not in contact with the display device 100 (e.g., input devices that hover proximate to a surface of the display and/or are approaching the surface of the display at a constant/variable rate). Various components of display device 100 may be usable to detect conditions associated with such touch input in order to predict one or more sonic characteristics of a contact which has yet to occur, as will be described in further detail below. "Touch input" as used herein refers to input received from input objects in contact with display device 100, as well as input objects not in contact/not yet contact with the display device. In some examples, display device 100 may be configured to receive input from two or more sources simultaneously, in which case the display device may be referred to as a multi-touch display device.

Display device 100 may be operatively coupled to an image source 106, which may be, for example, a computing device external to, or housed within, the display device 100. Image source 106 may receive input from display device 100, process the input, and in response generate appropriate graphical output 108 for the display device 100. In this way, display device 100 may provide a natural paradigm for interacting with a computing device that can respond appropriately to touch input. Details regarding an example computing device are described below with reference to FIG. 10.

Figure 2:
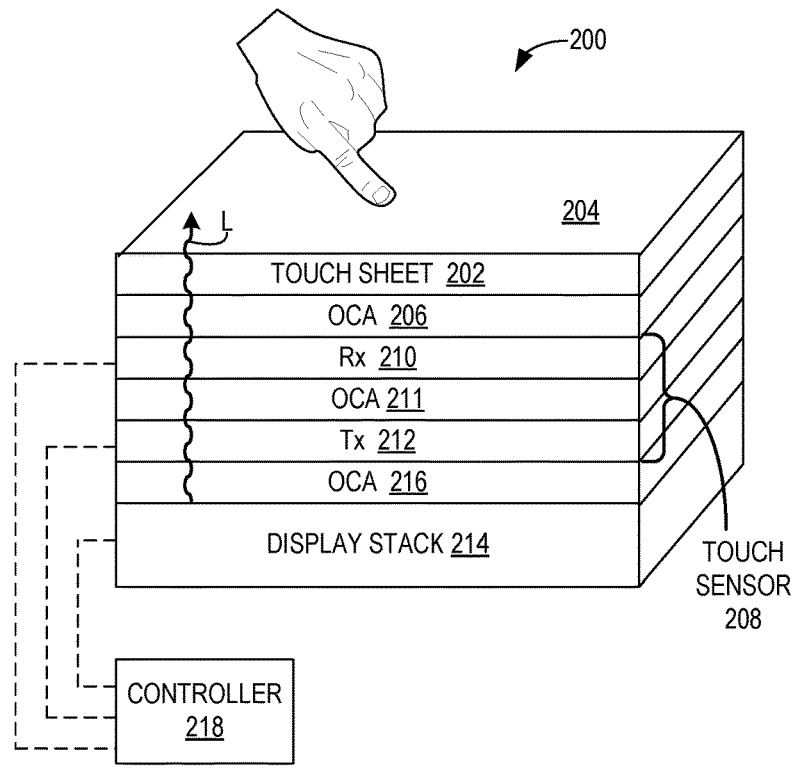
FIG. 2 depicts an optical stack and associated subsystems of the touch-sensitive display device of FIG. 1.

FIG. 2 is a cross-sectional view of an optical stack 200 of display device 100 of FIG. 1. Optical stack 200 may be a component of a sensing subsystem of display device 100, configured to detect one or more conditions associated with touch input to the display device. Optical stack 200 includes a plurality of components configured to enable the reception of touch input and the generation of graphical output. Optical stack 200 may include an optically-clear touch sheet 202 having a top surface 204 for receiving touch input, and an optically-clear adhesive (OCA) 206 bonding a bottom surface of the touch sheet 202 to a top surface of a touch sensor 208, which may correspond to touch sensor 101 of FIG. 1, for example. Touch sheet 202 may be comprised of any suitable material(s), such as glass, plastic, or another material. As used herein, "optically-clear adhesive" refers to a class of adhesives that transmit substantially all (e.g., about 99%) of incident visible light.

As described in further detail below with reference to FIG. 3, touch sensor 208 includes a matrix of electrodes that form capacitors whose capacitances may be evaluated in detecting touch input change capacitance in one or more of the capacitors in touch sensor 208 may be associated with a contact between an input object and the display device. As shown in FIG. 2, the electrodes may be formed in two separate layers: a receive electrode layer 210 and a transmit electrode layer (Tx) 212 positioned below the receive electrode layer. For example, receive and transmit electrode layers 210 and 212 each may be formed on a respective dielectric substrate comprising materials including but not limited to glass, polyethylene terephthalate (PET), or cyclic olefin polymer (COP) film. Receive and transmit electrode layers 210 and 212 may be bonded together by a second optically-clear adhesive (OCA) 211. OCA 211 may be an acrylic pressure-sensitive adhesive film, for example.

The touch sensor configuration illustrated in FIG. 2 is provided as an example, and other arrangements are within the scope of this disclosure. For example, in other implementations, layers 210, 211, and 212 may be integrally formed as a single layer with electrodes disposed on opposite surfaces of the integral layer. Further, touch sensor 208 may alternatively be configured such that transmit electrode layer 212 is provided above, and bonded, via OCA 211, to receive electrode layer 210 positioned therebelow.

Continuing with FIG. 2, touch sensor 208 is bonded, at a bottom surface of transmit electrode layer 212, to a display stack 214 via a third optically-clear adhesive (OCA) 216. Display stack 214 may be a liquid crystal display (LCD) stack, organic light-emitting diode (OLED) stack, or plasma display panel (PDP), for example. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as an image displayed on top surface 204 of touch sheet 202.

Further variations to optical stack 200 are possible. For example, implementations are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 2 also shows a controller 218 operatively coupled to receive electrode layer 210, transmit electrode layer 212, and display stack 214. Controller 218 is configured to drive transmit electrodes in transmit electrode layer 212, receive signals resulting from driven transmit electrodes via receive electrodes in receive electrode layer 210, and locate, if detected, touch input imparted to optical stack 200. Controller 218 may further drive display stack 214 to enable graphical output responsive to touch input. Two or more controllers may alternatively be provided, and in some examples, respective controllers may be implemented for each of receive electrode layer 210, transmit electrode layer 212, and display stack 214. In some implementations, controller 218 may be implement in image source 106 of FIG. 1.

Figure 3:
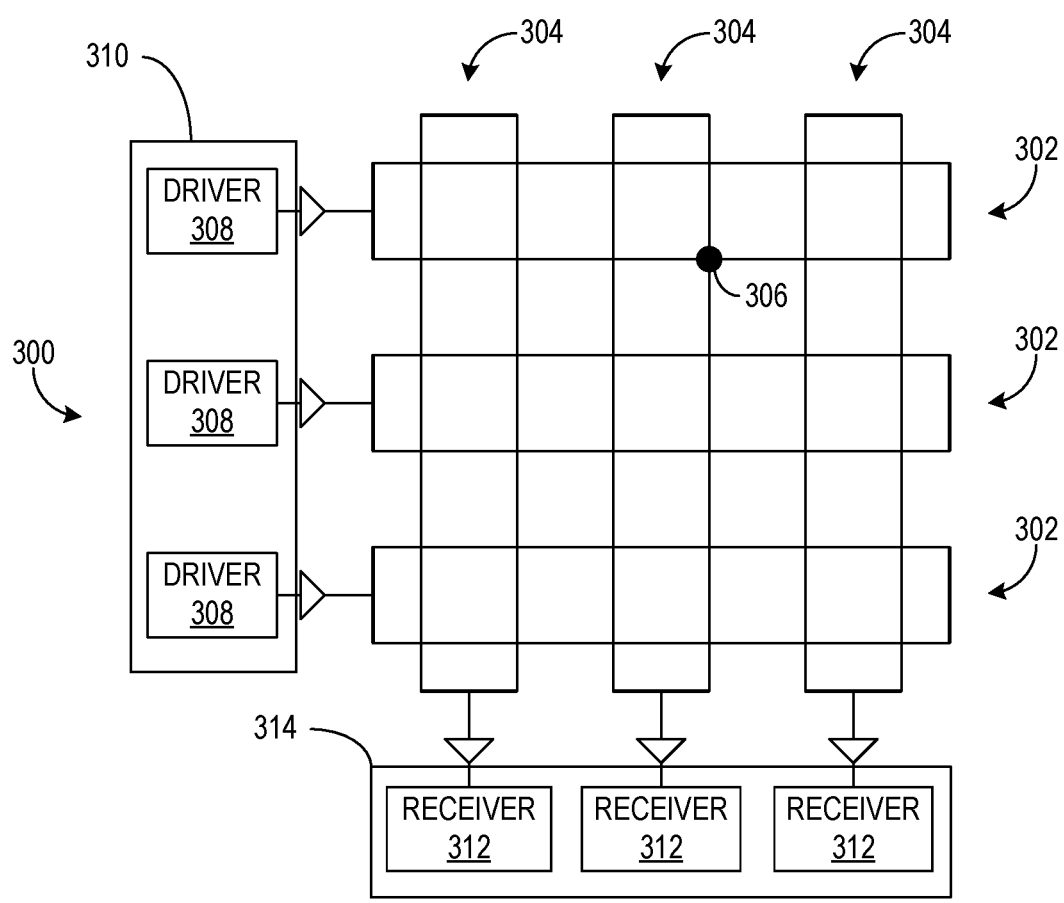
FIG. 3 depicts an example matrix of electrodes which may be included the optical stack of FIG. 2.

FIG. 3 shows an example touch sensor matrix 300. Matrix 300 may be included in touch sensor 208 of optical stack 200 of FIG. 2 to bestow touch sensing functionality to display device 100 of FIG. 1, for example. Matrix 300 includes a plurality of electrodes in the form of transmit rows 302 vertically separated from receive columns 304. Transmit rows 302 and receive columns 304 may be respectively formed in transmit electrode layer 212 and receive electrode layer 210 of optical stack 200, for example. Each vertical intersection of transmit rows 302 with receive columns 304 forms a corresponding node such as node 306 whose electrical properties (e.g., capacitance) may be measured to detect touch input. Three transmit rows 302 and three receive columns 304 are shown in FIG. 3 for the purpose of clarity, though matrix 300 may include any suitable number of transmit rows and receive columns, which may be on the order of one hundred or one thousand, for example.

While a rectangular grid arrangement is shown in FIG. 3, matrix 300 may assume other geometric arrangements for example, the matrix may be arranged in a diamond pattern. Alternatively or additionally, individual electrodes in matrix 300 may assume nonlinear geometries e.g., electrodes may exhibit curved or zigzag geometries, which may minimize the perceptibility of display artifacts (e.g., aliasing, moiré patterns) caused by occlusion of an underlying display by the electrodes. The transmit rows 302 and receive columns 304 may be positioned/oriented according to any suitable layout. For example, transmit rows 302 may be oriented horizontally with respect to ground, vertically with respect to ground, or at another angle. Likewise, receive columns 304 may be oriented horizontally with respect to ground, vertically with respect to ground, or at another angle.

Each transmit row 302 in matrix 300 may be attached to a respective driver 308 configured to drive its corresponding transmit row with a time-varying voltage. In some implementations, drivers 308 of matrix 300 may be driven by a microcoded machine implemented within a field-programmable gate array (FPGA) forming part of controller 218 of FIG. 2, for example. Each driver 308 may be implemented as a shift register having one flip-flop and output for its corresponding transmit row, and may be operable to force all output values to zero, independently of register state. The inputs to each shift register may be a clock, data input, and a blanking input, which may be driven by outputs from the microcoded state machine. Signals may be transmitted by filling the shift register with ones on every output to be excited, and zeroes elsewhere, and then toggling the blanking input with a desired modulation. Such signals are referred to herein as "excitation sequences", as these signals may be time-varying voltages that, when digitally sampled, comprise a sequence of pulses—e.g., one or more samples of a relatively higher digital value followed by one or more samples of a relatively lower digital value, or vice versa. If the shift register is used in this fashion, excitation sequences may take on only two digital values—e.g., only binary excitation sequences can be transmitted. In other implementations, drivers 308 may be configured to transmit non-binary excitation sequences that can assume three or more digital values. Non-binary excitation sequences may enable a reduction in the harmonic content of driver output and decrease the emissions radiated by matrix 300.

The drivers 308 may collectively be implemented as drive circuitry 310. Circuitry 310 may be configured to receive commands/inputs from one or more computer components, for example. Further, circuitry 310 may coordinate the activation of each driver 308. For example, circuitry 310 may establish an order in which each driver 308 is driven, as well as determine the signal each driver uses to drive its corresponding row.

Figure 4:
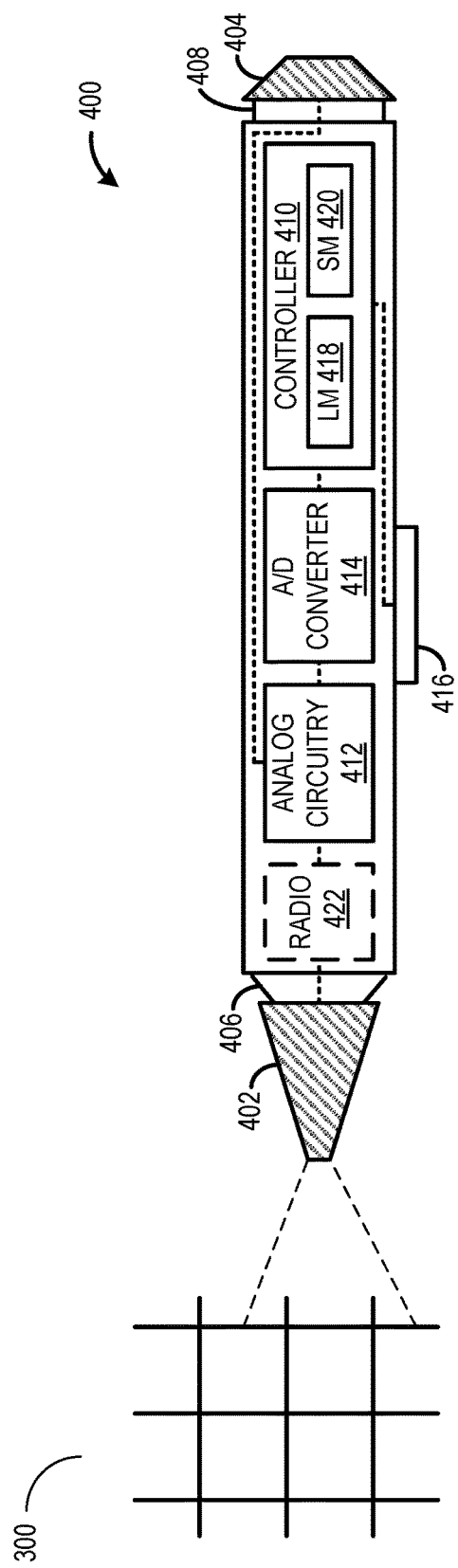
FIG. 4 depicts an example input object usable with the touch-sensitive display device of FIG. 1.

In some implementations, matrix 300 may be configured to communicate with an active stylus and/or other input objects, such as active stylus 400 shown in FIG. 4. This implementation may at least partially enable touch sensitive display device 100 to communicate with input object 104 when matrix 300 is implemented in display device 100. Specifically, an electrostatic channel may be established between one or more transmit rows 302 and a conductive element (e.g., electrode tip) of active stylus 400, along which data may be transmitted. Data transmitted via the electrostatic link may be evaluated by the sensing subsystem when detecting the one or more conditions associated with contact between the display device and an input object. In one example, communication via the electrostatic channel is initiated by the transmission of a synchronization pattern from matrix 300 to active stylus 400. The synchronization pattern may enable matrix 300 and active stylus 400 to obtain a shared sense of time, and may be transmitted via multiple transmit rows 302 so that active stylus 400 can receive the pattern regardless of its position relative to the matrix. The shared sense of time may facilitate the correlation of a time at which active stylus 400 detects an excitation sequence or other signal transmitted on transmit rows 302 to a location in matrix 300, as the synchronization pattern may yield an indication of the order in which transmit rows 302 are driven. Such correlation may enable active stylus 400 to determine at least one coordinate (e.g., y-coordinate) relative to matrix 300, which may be transmitted back to the matrix (e.g., via the electrostatic channel) or to an associated display device via a different communication protocol (e.g., radio, Bluetooth). To determine a second coordinate x-coordinate) of active stylus 400, all transmit rows 302 may be held at a constant voltage, and active stylus 400 may transmit a time-varying voltage to matrix 300, which may sequentially measure currents resulting from a voltage of active stylus 400 in each receive column 304 to ascertain the second coordinate.

Each receive column 304 in matrix 300 may be coupled to a respective receiver 312 configured to receive signals resulting from the transmission of excitation sequences on transmit rows 302. The receivers 312 may be collectively implemented as receive circuitry 314. Circuitry 314 may be configured to process and interpret electrical signals detected by the receivers, with the aim of detecting conditions associated with touch input to matrix 300. During touch detection, matrix 300 may hold all transmit rows 302 at a constant voltage except for one or more active transmit rows along which one or more excitation sequences are transmitted. During transmission of the excitation sequences, all receive columns 304 may be held at a constant voltage (e.g., ground). With the excitation sequences applied to the active transmit rows 302 and all receive columns 304 held at the constant voltage, a current may flow through each of the nodes formed by the vertical intersections of the active transmit rows with the receive columns. Each current may be proportional to the capacitance of its corresponding node. Hence, the capacitance of each node may be measured by measuring each current flowing from the active transmit rows 302. In this way, touch input be detected by measuring node capacitance. Matrix 300 may be repeatedly scanned at a frame rate (e.g., 60 Hz, 120 Hz) to persistently detect touch input, where a complete scan of a frame comprises applying an excitations sequence to each transmit row 302, and for each driven transmit row, collecting output from all of the receive columns 304. However, in other examples, a complete scan of a frame may be a scan of a desired subset, and not all, of one or both of transmit rows 302 and receive columns 304.

Other measurements may be performed on matrix 300 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

The above described touch sensor matrix is provided as an example, and is meant to be non-limiting. Other touch sensor configurations may be employed without departing from the scope of the present disclosure.

FIG. 4 shows an example active stylus 400. Active stylus 400 is an example of an input object. Active stylus 400 includes an electrode tip 402 on one end and an electrode eraser 404 on an opposing end. The electrode tip 402 and the electrode eraser 404 may be electrically conductive and configured to receive current when proximate to a driven electrode of electrode matrix 300 of FIG. 3. Tip 402 may include a pressure sensor 406 configured to detect a pressure when tip 402 is pressed against a surface. Likewise, eraser 404 may include a pressure sensor 408 configured to detect a pressure when eraser 404 is pressed against a surface. In one example, each of pressure sensors 406 and 408 are force sensitive resistors. A touch pressure value of each of the respective pressure sensors 406 and 408 may be sent to a controller 410. In one example, the touch pressure value may be represented by a 6 bit value. Further, a touch pressure value of either/both of pressure sensors 406 and 408 may be included in the one or more conditions associated with contact between a surface of the display device and an input object (e.g., active stylus 400).

As shown, electrode tip 402 and electrode eraser 404 are operatively coupled to analog circuitry 412. Analog circuitry 412 may include linear analog componentry configured to maintain the tip/eraser at a constant voltage and convert any current into or out of the tip/erase into a proportional current-sense voltage.

An analog-to-digital (A/D) converter 414 is operatively coupled to analog circuitry 412 and configured to digitize voltages received from analog circuitry 412 into digital data to facilitate subsequent processing. As a on-limiting example, converter 414 may convert incoming electrostatic signals having bandwidths of 100 kHz at a sampling rate of 1 Mbit/s.

Active stylus 400 includes a barrel switch button 416 that may be depressable by a user to provide additional user input. A state button 416 may be sent to controller 410.

The controller 410 includes a logic machine 418 and a storage machine 420 configured to hold instructions executable by logic machine 418 to perform various operations discussed herein. For example, controller 410 may be configured to receive signals from various sensors including pressure sensor 406, pressure sensor 408, and button 416. Further, controller 410 may be configured to process digitized signals from A/D converter 414 to perform other operations discussed herein.

Active stylus 400 may operate in a receive mode and a drive mode. Receive mode may be employed (1) to synchronize active stylus 400 to the computing device/processor associated with the touch-sensor, to establish/maintain a shared sense of time; and (2) to establish the Y coordinate of active stylus 400 with respect to the touch-sensor matrix the X coordinate in the event of vertically-oriented rows). Synchronization typically occurs at the beginning of the time frame, in which one or more rows on the touch-sensor matrix are drivers with a synchronization pulse that induce/vary electrical conditions on electrode tip 402 (or electrode eraser 404) of active stylus 400. The received signal is processed, typically via a correlation operation, in order to establish/maintain the shared sense of timing. Usually, multiple rows, spanning the entire height/width of the touch-sensor matrix, are driven with the synchronization pulse so that active stylus 400 receives an adequate signal regardless of its position relative to touch-sensor matrix 300.

Active stylus 400 may also operate in a receive mode during normal scanning of the rows of touch-sensor matrix 300. In other words, active stylus 400 may receive signals while the rows are scanned to establish the X and Y coordinates of finger hover/touch on touch-sensor matrix 300. The receive circuitry typically runs a correlation operation that is tuned to the drive signal(s) being used on touch-sensor matrix 300. Upon receiving a signal of greatest amplitude (e.g., highest correlation), active stylus 400 makes a note of the tinning of that highest signal. The recorded timing allows active stylus 400 and display device 100 of touch-sensor matrix 300 to know which row active stylus 400 was closest to, thereby establishing the Y position of active stylus 400. In some examples, active stylus 400 reports row position information (e.g., timing, value of a row counter) to touch-sensor matrix 300 over some type of wireless link (e.g., an optional radio transmitter 422). Instead of or in addition to a radio link, row position information may be transmitted electrostatically via excitation of the electrode tip 402 (or electrode eraser 404) of active stylus 400. Such information may constitute one or more conditions associated with a contact between the display device and active stylus 400.

In some implementations, interpolation may be employed to increase positional resolution. For example, assuming a highest amplitude at row K, amplitudes may also be noted for rows K−2, K−1, K+1, K+2. Assessing the amplitudes for these neighboring rows can enable finer determinations of Y position. Essentially, active stylus 400 "listens" for a communication from rows, and based on the "loudness" of that communication, an assessment is made as to how close active stylus 400 is to the row that is "talking." By assessing communication volume from a few rows on either side of the "loudest" row, a higher position granularity may be determined.

In addition to receiving during a "sync subframe" and during a "row-drive" subframe, active stylus 400 may drive its electrode (tip or eraser) during a "stylus-drive" subframe. In this case, application of a drive signal to the stylus tip electrode influences/varies electrical conditions on one or more column electrodes of the touch-sensor matrices. The column receive circuitry correlates, as described above, in order to interpret the received signals. The column experiencing the highest signal, or an above-threshold signal, is deduced to be the column that active stylus 400 is closest to, thereby establishing the X position of active stylus 400. And as with the Y determination, the conditions at a clustered grouping of columns may be used to establish a higher positional resolution.

It will also be appreciated that signals received in the stylus-drive subframe can be used to disambiguate Y-position of active stylus 400 in a system with two or more touch-sensing matrices. During the stylus-drive subframe, active stylus 400 will only light up columns on the matrix it was near, thereby enabling the ambiguity to be resolved.

Furthermore, during the stylus-drive subframe, active stylus 400 may transmit stylus information to display device 100 via the electrostatic channel formed between an electrode (e.g., tip 402, eraser 404) of active stylus 400 and touch-sensor matrix 300. As discussed above, various operations may be performed to reduce a size of a report that includes such stylus information in order to transmit the report in an efficient and robust manner such that data transmission via the electrostatic communication channel may be reduced.

Figure 5:
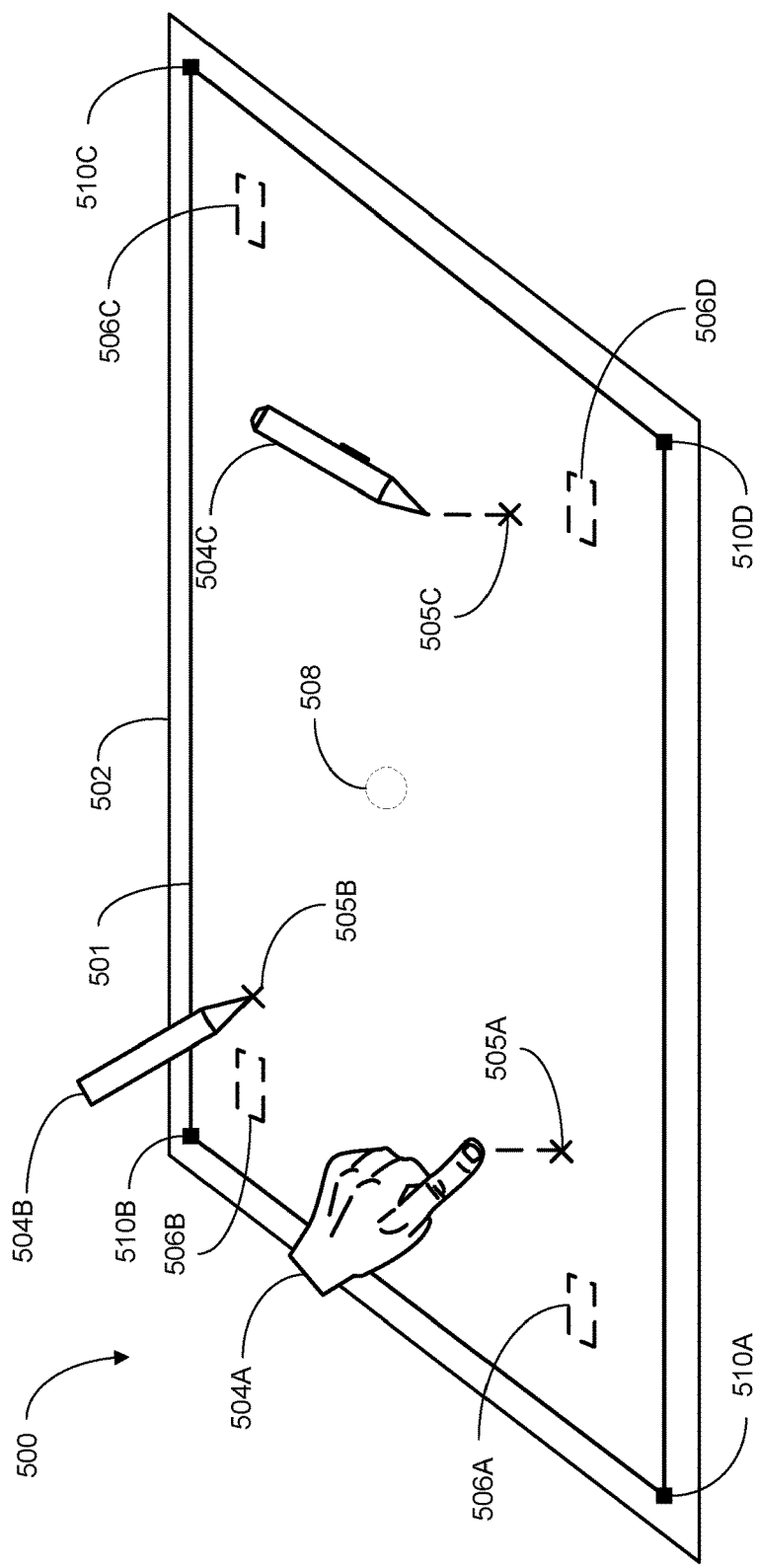
FIG. 5 depicts an example touch-sensitive display device.

FIG. 5 schematically depicts an example display device 500. As with display device 100, display device 500 may be any suitable size and form factor. Display device 500 includes a surface 501, which may be part of a touch-sensitive screen that display's visual content and is configured to accept touch input from styluses, fingers and other input objects.

Display device 500 further includes a sensing subsystem 502, which is configured to detect one or more conditions associated with touch input to the display device occurring via a contact of an input object with surface 501. As described in more detail below, sensed conditions may include one or more of: (1) a location of the touch input on the display device (2) a type or brand of the input object, or any other identification of the physical structure or characteristics of the input object that can affect its contact sound; (3) a speed at which the input object is traveling as it comes into contact with the display device; (4) a user of the input device; (5) a force/pressure of the contact occurring between the input object in the display device; (6) which end of an input object is being used, e.g., eraser end or writing end; (7) etc. As described in more detail below, the detected condition set is used to understand the nature of the sound that will result from the input object making contact with the display device. With this knowledge, the described systems and methods intelligently select and control a sound attenuation process that is specifically configured to reduce/eliminate, in a targeted way, undesirable sounds resulting from contact between the input object and display device. In one implementation, the selective attenuation includes frequency specific gain adjustments to sound being processed within the microphone system.

Sensing subsystem 502 may include a variety of components not specifically shown in FIG. 5 for detecting various conditions corresponding to touch input. As described above, touch input may include physical contact occurring between an input object and a surface of display device 500, and/or input occurring via proximity (i.e., an input object "hovering" above) to the surface of display device 500. Accordingly, conditions detected by sensing subsystem 502 may be associated with a contract which is occurring or has recently occurred, and/or a contact which may occur in the future (e.g., a predicted contact based on detected movement of a stylus toward the display device). As will be described below, a contact between an input object and the surface of the display device often produces an undesirable contact sound. Conditions detected by the sensing subsystem may be usable to determine a tinning of the contact, as well as sonic characteristics of a resulting contact sound. Sonic characteristics of the contact sound may vary based on conditions associated with the contact (type of stylus, stylus end, speed of contact, location of contact, etc.). As described in detail below and briefly mentioned above, display device 500 may take detected conditions and inferred sonic characteristics into account when selectively attenuating received sound. In many examples, this will lead to a desirable reduction in unwanted tapping or other sounds produced by the stylus/input object.

The contact sound attenuation described herein may be employed with a variety of input objects. Various examples are shown in FIG. 5, including 1) input object 504A, a human hand; 2) input object 504B, a passive stylus; and 3) input object 504C, an active stylus. Display device 500 may be used to detect conditions associated with touch input from any of the input objects 504, for example via the optical stack and electrode matrix of FIGS. 2 and 3. In the case of input objects 504A and 504B, detected conditions may include a detected change in capacitance between row electrodes and column electrodes in the vicinity of the input objects. In the case of input object 504C, detected conditions may include a change in capacitance, as well as one or more drive signals emitted by the active stylus, as described above with respect to FIG. 4. Conditions detected by sensing subsystem 502 may additionally include other information pertaining to/originating from input objects, including information transmitted via an electrostatic or radio link, for example.

Sensing subsystem 502 may detect a wide variety of conditions in order to selectively attenuate sound received into the microphone system of the display device. In one example, detected conditions may include an identification of an input object or one of its characteristics. For example, different varieties of input object (e.g., passive stylus, active stylus, human finger) may induce different electrical conditions within the display device (e.g., at a capacitive touch sensor matrix). As a result, sensing subsystem 502 may be able to identify a particular input object before it has made contact with the display device based on detected conditions, or upon contact. Because each of the input objects 504 may have different sizes, shapes, structures, etc., a contact sound produced by a contact between the display device and an input object may differ from a contact sound produced with a different input object. Accordingly, the display device may selectively attenuate sound received into a microphone system of the display device differently depending on the detected identifying characteristics of the input object.

Some varieties of stylus include multiple operative ends usable for interacting with a display device. For example, active stylus 400 includes a primary (e.g., tip) end and a secondary (e.g., eraser) end. Accordingly, the identifying characteristics indicated by the detected conditions may further describe/indicate an operative end of each input object, where applicable. Each operative end of an input object may influence electrical conditions in a touch sensor in different ways, allowing sensing subsystem 502 to determine which operative end is approaching/has contacted the display device. Further, an input object may include componentry usable for determining which operative end is approaching the display device, and relay this information to the display device electrostatically, or via a radio link, for example. Each operative end of an input object may have differing structures/characteristics that in turn cause different sounds to be produced upon contact with the display device. Accordingly, selective attenuation may additionally be based at least in part on a described operative end.

The identifying characteristics indicated by the detected conditions may additionally describe a brand of the input object, where relevant. For example, stylus devices such as input objects 504B and 5040 may be produced by a variety of manufacturers, each having different dimensions and properties. Input objects of different brands may have different effects on electrical conditions in a touch sensor, and the display device may accordingly be able to identify a brand of an input object for which conditions are detected. Further, an input object may transmit information indicating its own brand to a display device via an electrostatic or radio link, for example. These are nonlimiting examples, stylus brand may be detected in a variety of ways. As with different ends of one stylus, different brands of stylus may have different shapes, sizes, materials, etc., such that they produce different sounds when contacting a display device. These identifying characteristics (i.e., brand) may therefore control the selective attenuation applied within the microphone system. In general, this disclosure encompasses any identification of a stylus (brand, operative end, stylus type, etc.) so as to ascertain the character of its contact sound for the purpose of intelligently controlling sound-reducing attenuation within the microphone system of the display device.

As shown, input objects 504A and 504C are not contacting display device 500. Nonetheless, sensing subsystem 502 may still detect conditions associated with touch input to the display corresponding input objects 504A and 504C. For example, a human hand/finger (i.e., input object 504A) in the vicinity of display device 500 may affect capacitance between row electrodes and column electrodes of a sensing subsystem to a detectable extent before contacting the display device. Similarly, input object 504C may emit active signals detectable by sensing subsystem 502 even before the input object contacts the display.

Conditions detected by the sensing subsystem may include an indication of a two-dimensional location of a contact between an input object 504 and display device 500. Such a contact may be an actual contact, such as that between input object 504B and display 500. Additionally, conditions may include an indication of a two-dimensional location relative to display device 500 of a contact that has yet to occur. For example, input objects 504A and 504C may each be approaching display device 500, though not yet contacting it. Accordingly, sensing subsystem 502 may detect conditions corresponding to predicted/incoming contacts between input objects and the display device. For example, input objects 504A and 504B may affect capacitance at a limited number of nodes, such as node 306 described above with respect to FIG. 3. The sensing subsystem may use the locations of affected nodes in order to estimate the two-dimensional locations, interpolating based on the extent to which each node is affected. Similarly, interactions between input object 504C and display device

500, such as those described above with respect to FIGS. 3 and 4, may be usable to determine a two-dimensional location of input object 504C even before the input object has contacted the display. Two-dimensional contact locations between input objects 504 and display device 500, for both actual and predicted contacts, are represented in FIG. 5 by two-dimensional contact locations 505. In some implementations, two-dimensional locations may be expressed in terms of an X axis and a Y axis, where each of the X and Y axes are parallel to a plane of surface 501.

Contacts between are input, object and a surface of the display device may produce audibly different contact sounds depending on the specific two-dimensional location of the contact. For example, the surface of the display device may have different acoustic properties at different two-dimensional locations, based on the internal organization of the display device, or the manner in which the display device is being held/supported, for example. Accordingly, an indication of a two-dimensional location of a contact may be used by a display device when selecting a selective attenuation.

In some implementations, sensing subsystem 502 may be usable to determine a current three-dimensional position of each input object relative to surface 501 of display device 500. A three-dimensional position may include a two-dimensional location of an actual/predicted contact along X and Y axes, as well as an input object's position relative to a Z axis running perpendicular to surface 501. Accordingly, sensing subsystem 500 may determine a current distance of each input object away from surface 501. Such a distance may be referred to as a Z distance. An observed change in Z distance over time may correspond to a rate at which an input object is approaching/withdrawing from surface 501, as will be described in more detail below with respect to FIG. 6.

As indicated above, an active stylus such as input object 504C may include a variety of internal sensors/components configured to detect current conditions of the active stylus. For example, input object 504C may optionally include an accelerometer, configured to detect a current acceleration of the put object. Further, input object 504C may optionally include one or more fore se such as pressure sensors 406 and 408 of active stylus 400, configured to measure a force of a contact between the input object and the surface of the display device. This information, as well as any other relevant information detected by the input object, may be transmitted to the sensing subsystem and included with the one or more conditions associated with touch input. Contact force may have an effect on a contact sound produced by the contact, as more forceful contacts may produce louder and/or acoustically different contact sounds. Accordingly, information from an accelerometer and/or a force sensor may be used by the display device when selectively attenuating received sound.

It will be appreciated that display device 500 may be used with any suitable input objects, not only those shown in FIG. 5. Further, though three input objects are shown in FIG. 5, in other embodiments, any number and variety of input objects may be used.

In some implementations, display device 500 may include one or more contact sensors 506 configured to detect contact between an input object and the surface of the display device. Such contact sensors may be any type of sensor usable for converting a physical force applied to a surface of the display device into electrical current/digital information. Contact sensors 506 may be a component of sensing subsystem 502. It will be appreciated that contact sensors 506 may detect a variety of conditions associated with touch input to the display device, including many of the conditions described above. For example, information generated by contact sensors 506 may be usable to detect a two-dimensional location, timing, force, and identifying characteristics of an input object in contact with the display device. Further, display device 500 may include any suitable number of contact sensors 506, positioned in location relative to the surface of the display device. Many of the conditions detectable by the contact sensors may have an effect on sonic characteristics of a contact sound. Therefore, the display device may take information from the contact sensors into account when performing selective attenuation.

Display device 500 may also include one or more cameras 508. As with contact sensors 506, display device 500 may include any suitable number of cameras positioned in any location relative to the surface of the display device. Camera 508 may be embedded in surface 501 of display device 500. For example, camera 508 may be embedded in an optical stack such as optical stack 200, and visually identify input objects approaching/in contact with the display device. Alternately, camera 508 may be a component of display device 500 though not embedded in surface 501. Further, camera 508 may be external to display device 500, and communicate with display device 500 using a wired/wireless communication link. Accordingly, camera 508 may be a component of sensing subsystem 502, and information received from the camera may be included in the one or more conditions associated with touch input. Such information may be used to predict sonic characteristics that are likely to occur as a result of contact, which in turn can be used to select and apply a particular selective attenuation.

As described above, touch-sensitive display devices often include a microphone system configured to receive sound. In the present example, display device 500 includes a microphone system 510 with four individual microphones 510A-510D, though any number of microphones may be employed. Microphone system 510 may receive sound in the local environment of display device 500, which in include human speech, music, contact sounds from styluses, etc. As described elsewhere and throughout this disclosure, microphone system 510 receives sound from the environment surrounding the display device, and this sound often includes tapping or other undesired sound produced as a result of a stylus or other input object contacting the surface of the display device. Within the microphone system and/or other parts of the display device, the sound received by the microphone system is processed to reduce or eliminate the contact sounds produced by the input object. Typically, the processing is a selective attenuation that is tailored to the specific sonic characteristics of the contact sound, and is applied for a precisely controlled, time-limited duration, so as to minimize the potential for attenuating desired sounds picked up by the microphone system.

Display device 500 may be used by a number of different users, individually and/or simultaneously. Conditions detected by various components of sensing system 502 may therefore be usable to determine the identity of any and all users currently using the display device. As with other determinations made by the sensing system, this identification may be made for the purpose of determining sonic characteristics of contact sounds made by input objects. For example, display device 500 may associate particular input objects with particular users, and identify a user any time contact is detected between the surface of the display device and a known input object. Display device 500 may prompt any and all active users to identify themselves before providing touch input. One or more users may log in to an operating system of display device 500 and/or access specific user profiles, allowing display device to determine user identities. Further, camera 508 may be usable to identify users via facial recognition, and microphone system 510 may be usable to identify users via voice recognition. In general, display device 500 may make use of a variety of accessible information in order to determine the identities of one or more users. Different users of a display device may have different touch input habits, and/or use different is put objects, and therefore produce different contact sounds. For example, two different users may interact with a display device using the same input object, and yet produce contact sounds with different sonic characteristics. Accordingly, user identity may also be considered when determining sonic characteristics and selecting appropriate attenuation.

Figure 6:
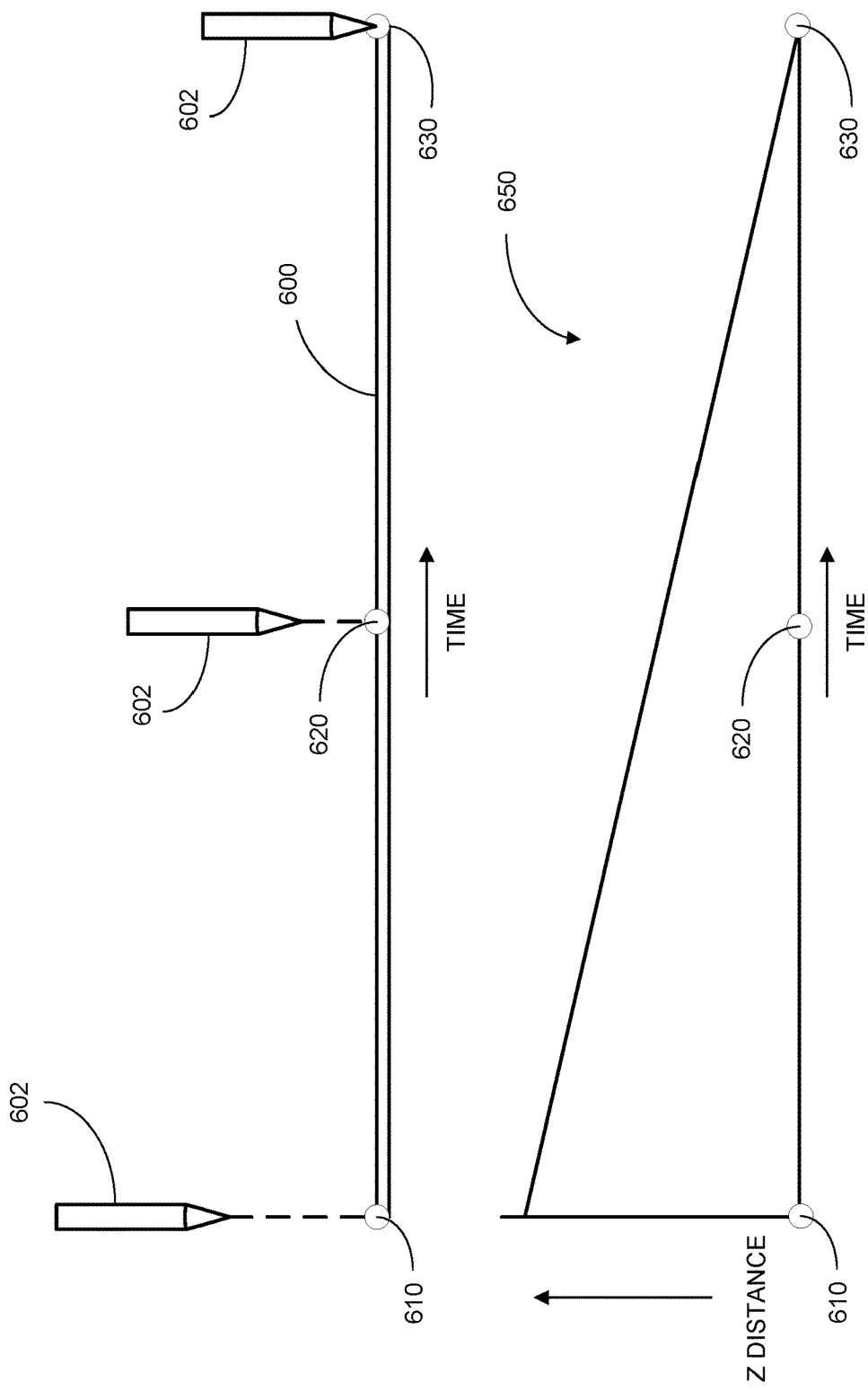
FIG. 6 depicts an example input object approaching a touch-sensitive display device.

FIG. 6 schematically depicts a touch-sensitive display device 600, which may be substantially similar to display device 500 described above. For example, display device 600 may include a sensing subsystem (not shown) configured to detect one or more conditions associated with touch input to the display occurring via a contact of an input object with a display device's surface. Conditions detected by the sensing subsystem may ultimately be used to select a selective attenuation for reducing contact sounds in received sound.

FIG. 6 also shows an input object 602, which approaches display device 600 over time. As described above with respect to FIG. 5, a touch sensor (or other sensing mechanism) may determine a distance between an input object and the display device i.e., a Z distance). For example, an input object may affect electrical conditions/signals in an electrode matrix. Changes in these conditions/signals can be correlated with changes in Z distance between the display device surface and the input object.

FIG. 6 depicts tracking of Z distance changes over time. As shown in FIG. 6, input object 602 approaches display device 600 over a series of successive time intervals 610, 620, and 630, contacting the display device at time 630. Accordingly, the one or more conditions detected by the sensing subsystem may include an indication of a speed of the input object, calculated by evaluating the change in Z distance over time. A speed of the input object may be proportional to or associated with a force of an incoming contact, which may in turn affect contact sounds produced by the contact, and/or the duration of the contact sound. Accordingly, an indicated speed of an input object may be considered when selecting a selective attenuation.

Display device 600 may be configured to determine, based on the one or more conditions detected by the sensing subsystem, a time of a contact between an input object and a surface of the display device. In the case of an input object which has yet to contact the display device, determining the time of the contact may include predicting at what time contact will occur. This prediction may be based on any/all of the detected conditions. In particular, a current speed of the input object, as detected by the sensing subs may be extrapolated into the future in order to predict the time of contact. For example, display device 500 may construct a plot such as plot 650, showing Z distance over time. A slope of plot 650 may correspond to a current speed of input object 602, which may be extrapolated forward until an X intercept is reached, corresponding to a time of contact. In FIG. 6, this corresponds to time 630. As discussed elsewhere, one use of the determined time of contact is to determine when to begin applying the selective attenuation. In general, it is usually desirable that the selective attenuation be applied for only so long as necessary to desirably attenuate the unwanted contact sound, so as to limit the potential for filtering out human voices or other desired sounds.

As input object 602 approaches display device 600, a sensing subsystem may further be able to determine a current angle of input object 602. As shown in FIG. 6, input object 602 approaches display device 600 substantially parallel to a Z axis. However, users may bring an input object toward a display device at any suitable angle. For instance, while using a stylus to write/take notes on a display device, the user may hold the input object at an angle relative to the Z axis. This angle may be between 0 and 60 degrees, for example. Accordingly, the one or more conditions detected by the sensing subsystem indicate an angle of approach of an input object. Different approach angles of an input object may also affect a contact sound resulting from a contact between the input object and the display device. Accordingly, information regarding approach angle may be used by the display device when selecting a selective attenuation.

As described above, contact between an input object and a surface of the display device may produce a contact sound, which may be received into a microphone system. An audio output produced by a display device may include a number of such contact sounds produced during contacts between the display device and any number of input objects. Audio output may refer to the end result of a processing operation in which a received sound is selectively attenuated to generate the audio output. This output nay be an electrical signal that can then be used at any location and on any device to drive a speaker to generate sonic output in which tapping noise is reduced from what it would otherwise be. For example, the audio output may be a digital signal which is transmitted to one or more external devices for recording/playback, and/or an analog signal which may be recorded/played locally. Accordingly, components of a display device, such as display device 500 and display device 600, may be usable to selectively attenuate sound received into a microphone system in order to at least partially attenuate contact sounds. For example, a display device may include a storage machine and a logic machine configured to execute instructions held by the storage machine. Execution of such instructions may result in selective attenuation of received sound, as will be described below.

A touch-sensitive display device may include a sensing subsystem configured to detect a number of conditions associated with a contact, as described above with respect to FIGS. 5 and 6. Such conditions may indicate, for example, a two-dimensional location of the contact, identifying characteristics of the input object, a speed of the input object, a force of the contact, an angle of approach of the input object, an identity of a user of the display device, etc. A contact sound produced by a contact between an input object and a surface of a display device may sound differently based on the one or more conditions. For example, input objects may produce a different contact sound when contacting different two-dimensional locations relative to the surface of the display, based on the internal organization and acoustic properties of the display device. Similarly, input objects with different identifying characteristics (e.g., structure, brand, operative end) may produce different contact sounds. Speed of the input object and force of the contact may affect a sound produced—for example higher speed and greater force may produce a louder contact sound which persists for a longer duration. A contact sound produced by a contact may vary according to the angle at which the input object strikes the display. Further, different users may have differently shaped hands, strike the display with more/less force, and/or exhibit other user-specific touch input habits which may affect the contact sounds each user produces when interacting with a display device.

Accordingly, a contact sound may be described by sonic characteristics, and sonic characteristics for a particular contact may be determined by a display device based on at least the determined time of the contact. In general, sonic characteristics may describe approximately when a contact sound produced by a contact started/is expected to start. As additional conditions are detected and additional information is learned about a particular input object, sonic characteristics may be determined based on the accumulated/new detected conditions. For example, sonic characteristics may indicate distribution and magnitude for frequencies/overtones present in the contact sound, as well as an overall loudness of the contact sound. Sonic characteristics may be determined for a contact which has recently occurred, for example by evaluating information from one or more contact sensors. Alternatively, sonic characteristics may be determined for a contact which has yet to occur. In that case, sonic characteristics may be predicted based upon what is known about the input object from the one or more conditions.

Figure 7:
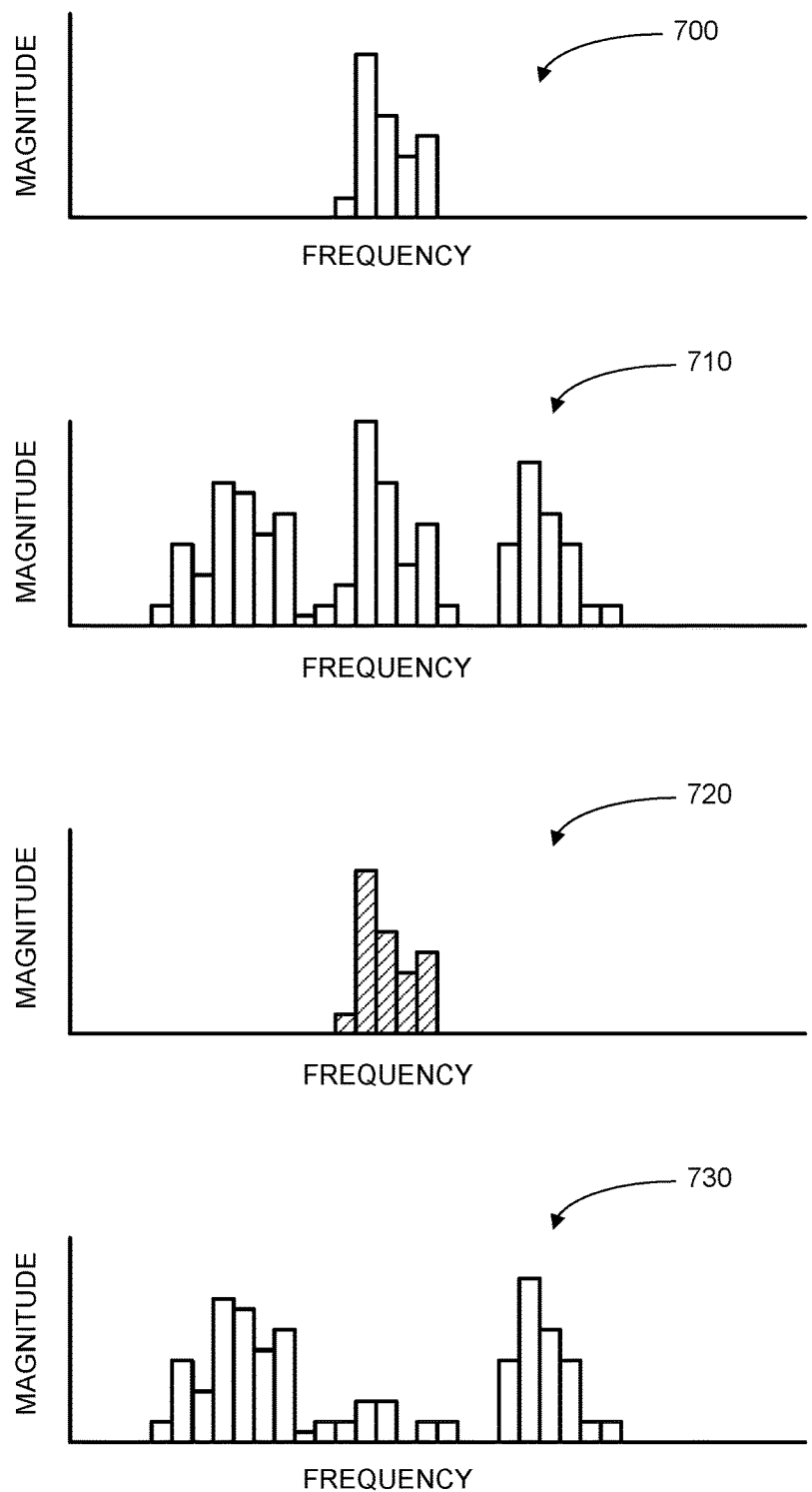
FIG. 7 depicts selective attenuation of a sound associated with a contact.

FIG. 7 schematically depicts a plot 700 showing sonic characteristics for a contact between an input object and a surface of a display device. Plot 700 takes the form of a frequency-domain representation of a contact sound. Plot 700 shows individual frequencies in the contact sound, as well as each frequency's relative magnitude, resulting n a unique sonic signature for the contact. Sonic characteristics shown in plot 700 may be determined for a contact which has just occurred, and/or a predicted/incoming contact. As described above, the specific appearance of sonic characteristics in plot 700 (i.e., distribution and relative magnitude of frequencies) may depend on the one or more conditions detected by the sensing subsystem.

Plot 710 shown in FIG. 7 is a frequency-domain depiction of sound received into a microphone system. The frequency spectrum shown n plot 710 may therefore correspond to human speech, music, and/or other desirable sound, as well as contact sounds produced by contacts between an input object and a surface of the display device. In other words, at least some of the frequencies shown in plot 710 may correspond to a contact sound and not desirable sound.

Accordingly, it may in some cases be desirable for a display device to generate an audio output by applying a selective attenuation to process sound received into the microphone system. The selective attenuation may be selected based on the sonic characteristics. Plot 720 of FIG. 7 shows an example selective attenuation selected for the sonic characteristics shown in plot 700. Application of the selective attenuation to the received sound shown plot 710 may result in at least a partial removal of the contact sound. The frequency spectrum shown in plot 720 is filled with diagonal lines, in order to indicate that the spectrum does not represent received sound. Rather, the spectrum shown in plot 720 indicates frequencies to be removed from a sound. As shown, the frequency spectrum shown in plot 720 has the same magnitude and distribution as the frequency spectrum for the sonic characteristics shown in plot 700. This is done so that application of the selective attenuation to received sound may selectively attenuate only the frequencies associated with the contact sound. In some implementations, applying the selective attenuation includes applying frequency-dependent gain to the sound received into the microphone system, where the frequencies subject to frequency-dependent gain are those shown in plot 720.

As will be described below with respect to FIG. 8, the selective attenuation shown in plot 720 may be immediately generated dynamically, in real-time for the sonic characteristics shown in plot 700. Alternatively, the display device may maintain a database or lookup table including a number of template selective attenuations which correspond to different sets of sonic characteristics. This database/lookup structure may be generated at design time, during engineering of the system, and/or may be constructed/supplemented during end-user operation of the system. In the case of such a lookup table implementation, the display device may, upon determining sonic characteristics, consult the lookup table and select a matching selective attenuation, which then may be applied to the received sound.

Plot 730 of FIG. 7 shows an audio output generated via applying the selective attenuation shown in plot 720 to the received sound shown in plot 710. As shown, processing of the received sound has reduced the magnitude of individual frequencies corresponding to the sonic characteristics shown in plot 700. Accordingly, the generated audio output may include any desirable sound received into the microphone system, and not include a contact sound produced by a contact between an input object and a surface of a display device. The audio output shown in plot 730 may be recorded for later playback, sent to one or more speakers for immediate playback, and/or transmitted to one or more external communication devices as part of an audio stream.

As shown in FIG. 5, a display device may include a microphone system comprising several differently-located microphones. Each differently-located microphone may receive a slightly different subset of sound occurring in the display device's local environment. When generating the audio output, sound from each different microphone in the microphone system may be "mixed" together into a single audio track. Turning briefly to FIG. 5, a contact sound produced by a contact between input object 505A and surface 501 may be well represented in sound received by microphone 510A, though largely absent from sound received by microphone 510C. Similarly, sound produced by a contact between input object 504C may be well represented in sound received by microphone 510D, and largely absent from sound received by other microphones 510. Accordingly, it may in some cases be desirable to apply a selective attenuation differently at each differently-located microphone based on the microphones being differently-located. For example, when applying selective attenuation for sound produced by a contact at location 505A, the selective attenuation may be applied more heavily to sound received by microphone 510A than it is for other microphones 510. In general, a selective attenuation may be applied more heavily to a particular microphone than to others if it is determined that a contact sound is more heavily represented in sound received by the particular microphone (determined, for example, by evaluating the volume in decibels of that microphone's received sound), and/or if it is determined that the two-dimensional location of the particular microphone is nearer to the two-dimensional location of a contact than other microphones.

Figure 8:
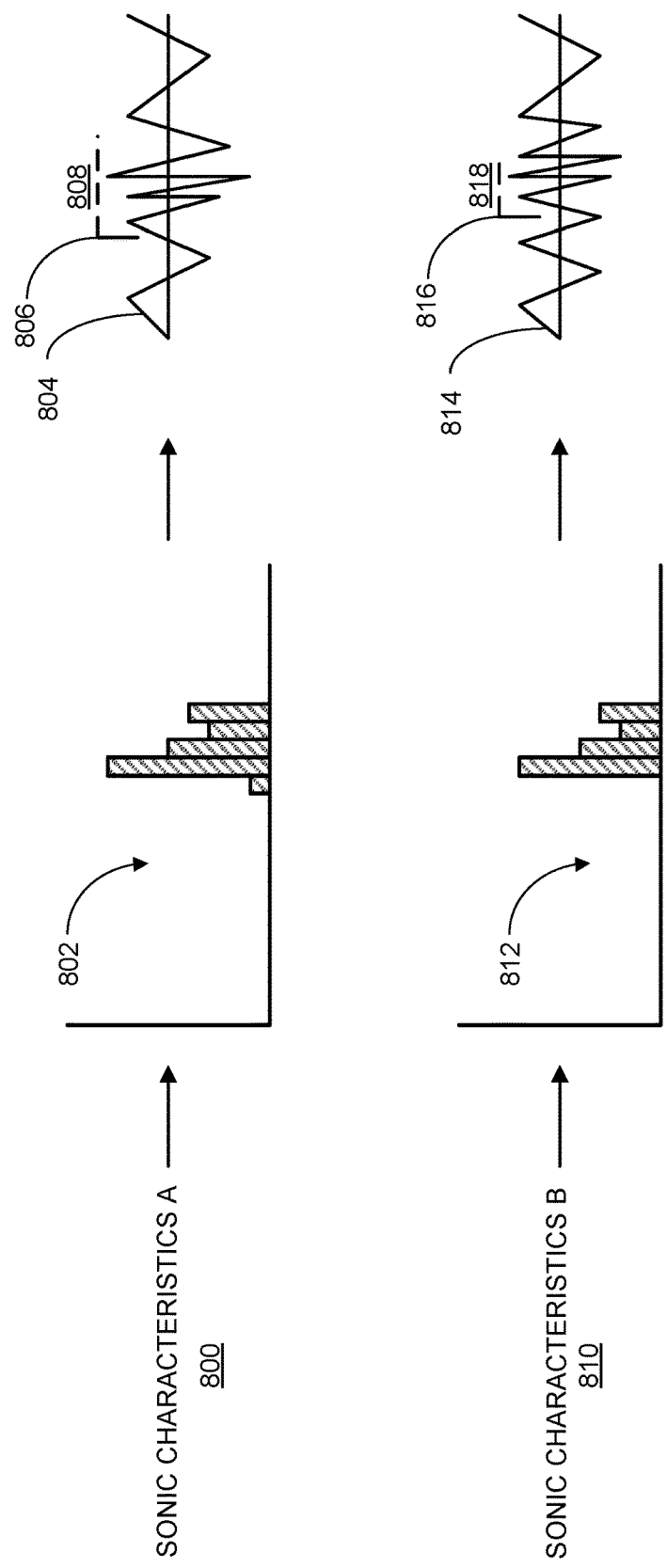
FIG. 8 depicts selection of a selective attenuation based on sonic characteristics.

FIG. 8 schematically shows selection of a selective attenuation based on sonic characteristics, and application of a selective attenuation to received sound. Sonic characteristics A 800, shown in FIG. 8, may be a set of sonic characteristics based at least on the determined time of a contact, as well as one or more conditions detected by a sensing subsystem. Based on the sonic characteristics, the display device may select a selective attenuation, such as selective attenuation 802, to be applied to received sound.

Additionally or alternatively, a display device may be configured to selectively replace a contact sound with a reconstruction of a desirable sound (e.g., human voice, music).

Upon choosing of a selective attenuation 802, the selective attenuation may be applied to sound received into a microphone system. In some implementations, a selective attenuation may only be applied when a ratio between a detected volume of a contact sound and a detected volume of other sounds in a local environment exceeds a threshold. Plot 804 is a time-domain approximation of an audio waveform received by a microphone system. While sonic characteristics A 800 and selective attenuation 802 may be determined for a recently occurred contact or predicted for a contact which has yet to occur, plot 804 shows an audio waveform as it is received by the microphone system in real-time. As shown, plot 804 depicts a substantially regular audio wave, interrupted by sudden irregularities beginning at time of contact 806. Time of contact 806 may indicate a time at which the display device predicted a contact would occur. Accordingly, the display device may apply selective attenuation 802 to received sound beginning at time of contact 806. Time of contact 806 may be substantially similar to the actual time at which the input object contacts the display device, depending on the accuracy of conditions detected by the sensing subsystem.

Selective attenuation 802 may be applied over a time interval 808 beginning at the determined time of contact 806. As described elsewhere, it is generally desirable to ensure that a selective attenuation is applied for only the length of the contact sound. If a selective attenuation is applied for too short a time, the contact sound may not be completely removed from the audio output. Conversely, if the selective attenuation is applied for too long a time, it may overly interfere with voices or other desirable sounds. Accordingly, a length of time interval 808 may be set equal to a predicted length of the contact sound produced by the contact. To accomplish this, the length of the time interval may vary based on any/all of the one or more conditions detected by the sensing subsystem. For example, a contact sound produced by a contact of relatively higher force may persist longer than a contact sound produced by a contact of relatively less force. This may be determined through use of a contact sensor and/or force sensor, as well as calculated based on a determined speed of the input object. As such, the display device may apply a selective attenuation for a more forceful contact sound over a longer time interval than a less forceful contact sound. This is shown in FIG. 8, as time interval 808 lasts for approximately the same length of time as the irregularities in plot 804 caused by the contact sound. Interval length may also change based on two-dimensional contact location, input object identifying characteristics, user identity, etc., and each of these conditions may be used to determine an appropriate time interval over which a selective attenuation should be applied.

FIG. 8 also shows sonic characteristics B 810, which may be a substantially different set of sonic characteristics than sonic characteristics A 800. For example, sonic characteristics B 810 may be determined based different conditions detected by the sensing subsystem. Accordingly, the display device has selected selective attenuation 812, which is designed to attenuate frequencies differently from sonic characteristics 802. For example, sonic characteristics 810 may correspond to a different type of input object, a more/less forceful contact, a contact at a different two-dimensional location, etc. Selective attenuation 812 is applied to plot 814 starting at time of contact 816 persisting over time interval 818. As shown, a length of time interval 818 differs from the length of time interval 808. This may be based on differences between sonic characteristics A 800 and sonic characteristics B 810.

As described above, a sensing subsystem of a display device may determine which user(s) are currently using input objects to interact with the display device. Accordingly, a determined user identity may be included in the one or more conditions detected by the sensing subsystem. A time of a contact and sonic characteristics may then be based on the user identities. Accordingly, a selective attenuation may be selected based on an identity of a user of the display device. For example, different users of the display device may have different touch input habits, which may affect the contact sounds produced when each user interacts with the display device. Accordingly, the display device may select different selective attenuations for each user, in order to best remove contact sounds from an audio output.

In some implementations, a selective attenuation may be automatically generated once sonic characteristics for a contact are determined. Alternatively, a display device may maintain a database/lookup table including a plurality of prepared selective attenuations, each of which matching a particular set of sonic characteristics. Such a lookup table may be organized in a similar manner to FIG. 8, in which for a given set of sonic characteristics, the display device automatically selects a selective attenuation and applies it to received sound.

A lookup table as described herein may utilize any suitable degree of granularity in order to effectively choose selective attenuations for contact sounds. For example, on a basic level, a display device may determine sonic characteristics for an input object based on a single condition, and consult a lookup table to choose a selective attenuation for the determined sonic characteristics. With increasing complexity, a display device may detect multiple different conditions for a contact, each detected condition altering the determined sonic characteristics. In this example, different selective attenuations may be available for each different possible set of sonic characteristics determined iron the detected conditions. For example, a display device may detect a particular input object approaching at a particular two-dimensional location, having a certain speed, in the hands of a certain user, and predict highly specific sonic characteristics for the contact. Accordingly, the display device may consult a lookup table and select a selective attenuation specific to each of the above conditions. Further, the lookup table may provide different selective attenuations based on the predicted length of the time interval, which may be indicated by the sonic characteristics.

A selective attenuation selected from such a lookup table may not match exactly the determined sonic characteristics, though be applied anyway in order to conserve computational resources. Additionally, a chosen selective attenuation may be modified in order to account for the specific determined sonic characteristics. This may include, for example, adjusting a selective attenuation to account for a different two-dimensional location, brand of stylus, force of contact, etc.

It will be appreciated that a display device may determine any combination of sonic characteristics, and therefore select any appropriate selective attenuation. A selected attenuation may then be applied to sound received in any context at any time, and application may persist over any suitable time interval. FIG. 8 is intended only to illustrate the general process of selective attenuation selection and application, and is not intended to limit the present disclosure.

In some implementations, a display device may be usable to progressively develop custom selective attenuations for an input object. This may include recording conditions detected for a series of touch events between the input object and the display device, and evaluating the extent to which an applied selective attenuation successfully removed contact sounds from the generated audio output. Over time, the display device may progressively learn more about the acoustic properties of the input object in various settings, the usage habits of the user, the acoustic properties of the display device itself, acoustic properties of a local environment of the display device, etc. This information may be used to build a selective attenuation/progressively tailor an existing selective attenuation in order to better remove contact sounds from sound received in the future. Such custom selective attenuations may be built for a number of different input objects. Further, custom selective attenuations may be stored in/used to build a lookup table as described above, such that next time the display device detects a contact with a known input object, the specific conditions of the contact may be used to automatically select an appropriate selective attenuation from the lookup table.

Figure 9:
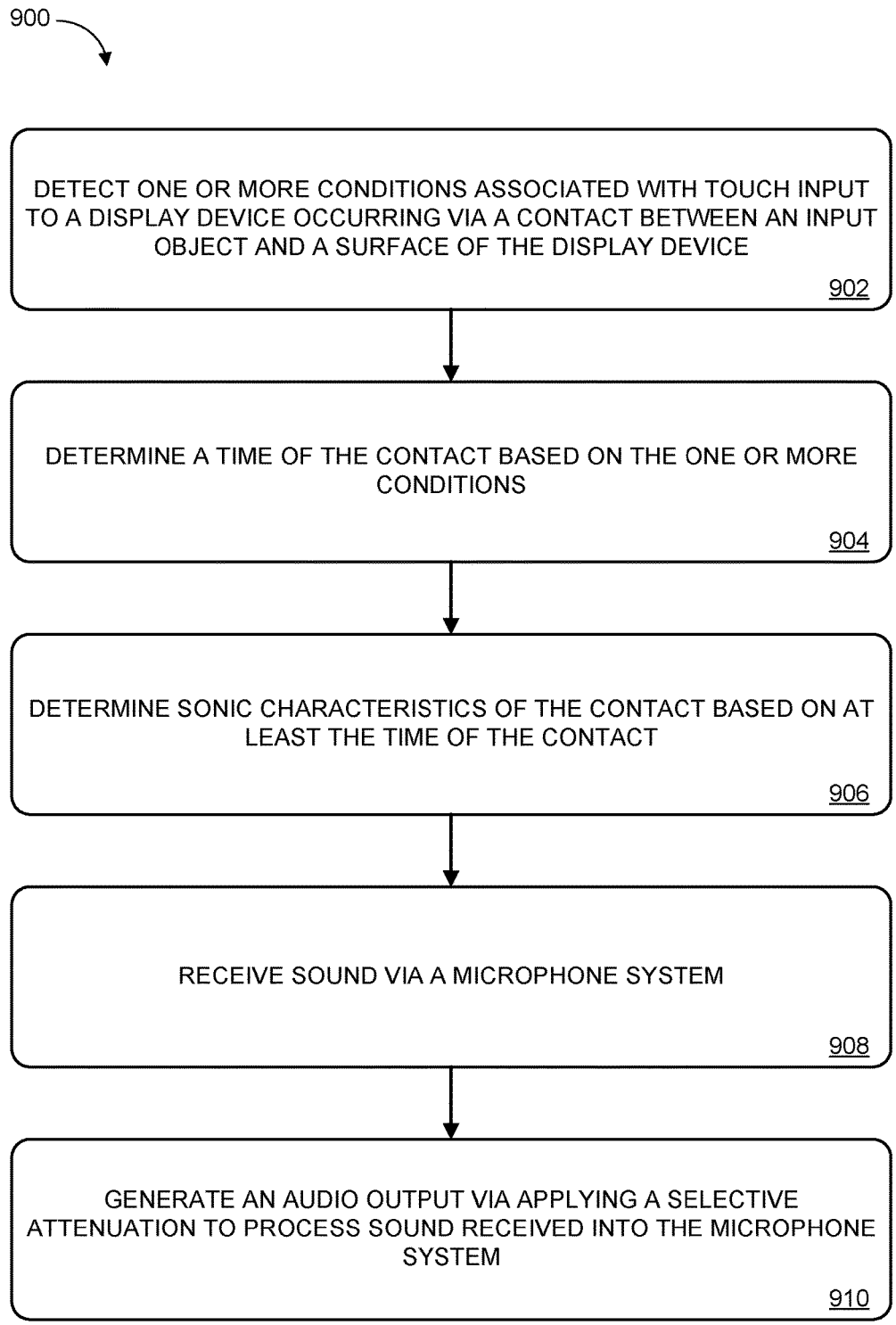
FIG. 9 depicts an example method for attenuating sound.

FIG. 9 illustrates method 900, an example method for attenuating sound. At 902, method 900 includes detecting one or more conditions associated with touch input to a display device occurring via a contact between an input object and a surface of the display device. Detected conditions may include, for example, a two-dimensional location of the contact; identifying characteristics of the input object describing a structure, brand, and/or operative end of the input object; a speed of the input object; a force of the contact; and an identity of a user of the display device.

At 904, method 900 includes determining a time of the contact based on the one or more conditions. A determined time of the contact may correspond to a time at which a contact has just occurred, or a future time at which a contact is predicted to occur.

At 906, method 900 includes determining sonic characteristics of the contact based at least the time of the contact. Sonic characteristics may additionally be determined based on any/all of the detected conditions. For example, input object type, two-dimensional contact location, contact force, user identity, etc. may each affect a sound produced by a contact, and may therefore need to be accounted for when determining sonic characteristics for the contact.

At 908, method 900 includes receiving sound via a microphone system. Received sound may include desirable sound such as human speech, music, etc., as well as contact sounds produced by contacts between an input object and a surface of the display device.

At 910, method 900 includes generating an audio output via applying a selective attenuation to process sound received into the microphone system. The selective attenuation may be selected based on the sonic characteristics, and at least partially remove contact sounds from the audio output. A selective attenuation may be selected from a database or lookup table including a number of selective attenuations matched to combinations of sonic characteristics.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
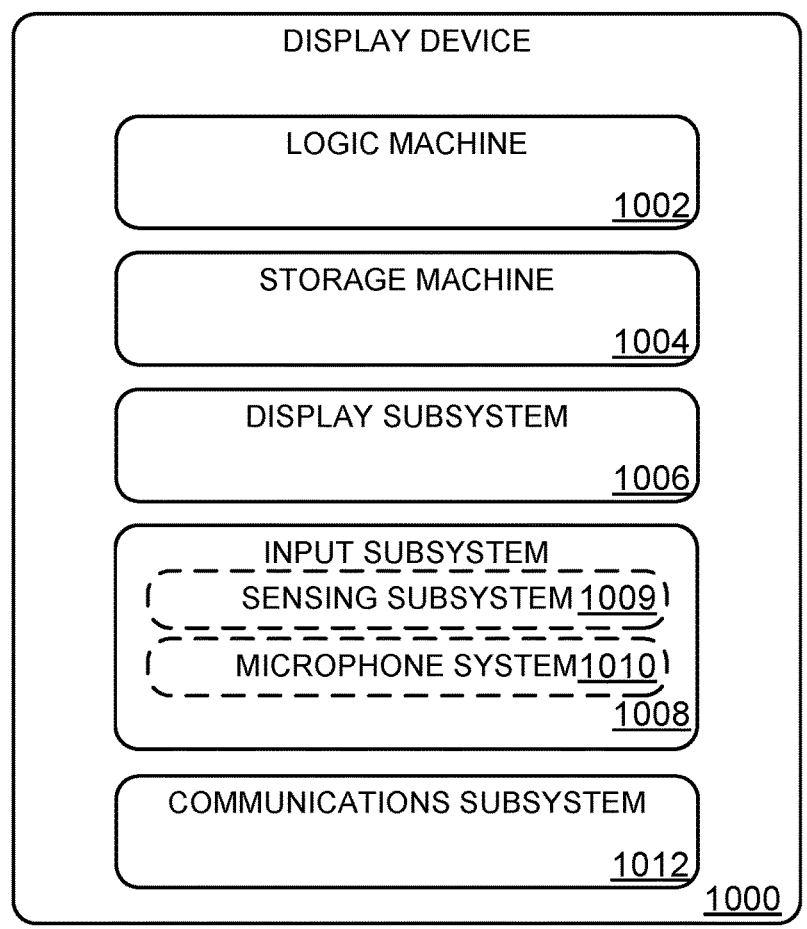
FIG. 10 depicts an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaining devices, mobile computing devices, mobile communication devices (e.g., smart phone), and/or other computing devices.

To summarize, the example systems and methods herein include determining conditions associated with contact occurring between a stylus or other input object and the surface of a touch-interactive display device. A very wide range of mechanisms may be employed to determine the conditions, including pre-interaction determinations (e.g., from user inputs) and real-time sensing via touch sensors, accelerometers, force sensors, cameras, microphones, etc. Detection of conditions may occur via operation of the display device, operation of the stylus, concerted action of the stylus and display device together, and/or through other devices/sensors/software. To the extent that communication between the stylus and display device is needed for the purpose of detecting contact conditions, information may be communicated between the stylus and display device via electrostatic communication, radio link communication, or other communication mechanisms. From the detected conditions, a time of the contact may be determined, as well as sonic characteristics associated with the contact. In one example, contact time is determined/predicted via operation of a touch sensor that can detect "hover." Sonic characteristics may be determined at various times (e.g., design time and/or during real-time, operation) such that they are associated with condition sets. For example an (1) eraser end of (2) a particular brand of stylus (3) being operated by a particular user (4) that contacts a particular location of the display device (5) with a particular speed may be correlated, via empirical observation of that condition set, with particular sonic characteristics (e.g., a frequency spectrum characterization). These sonic characteristics may be matched—e.g., via a lookup table—with a selective attenuation suitable for desirably attenuating the contact sound. The condition set may further indicate how long of an interval that the selective attenuation may be needed, so as to achieve a desired attenuation of the contact sound while minimizing impact on voices or other wanted to sounds.

Computing system 1000 includes a logic machine 1002 and a storage machine 1004. Computing system 1000 may optionally include display subsystem 1006, input subsystem 1008, communication subsystem 1012, and/or other components Trot shown in FIG. 10. In some implementations, each of the components shown in FIG. 10 may be collectively included in a single enclosure. Alternatively, any/all of the components described with respect to FIG. 10 may be separately housed/located, and communicate with each other over wired/wireless links. For example, a touch-sensitive "device" can refer to a distributed arrangement in which the touch-responsive component can be in a separate housing from microphones and other sensors, processing and/or storage components.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server computing devices.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. In particular, input system 1008 may include a sensing subsystem 1009 and a microphone system 1010. Sensing subsystem 1009 may include a variety of components usable for detecting one or more conditions associated with contact between an input object and a display device. Microphone system 1010 may include one or more microphones configured to receive sound.

When included, communication subsystem 1012 may be configured to communicatively couple computing system 1012 with one or more other computing devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1012 to send and/or receive messages to and/or from other devices via a network such as the Internet.

In an example, a display device comprises: a sensing subsystem configured to detect one or more conditions associated with touch input to the display device occurring via a contact of an input object at a surface of the display device; a microphone system configured to receive sound; a logic machine; and a storage machine holding instructions executable by the logic machine to: determine, based on the one or more conditions, a time of the contact; determine, based on the one or more conditions, sonic characteristics of the contact; and generate an audio output via applying a selective attenuation to process sound received into the microphone system, the selective attenuation being selected based on the sonic characteristics and applied over a time interval beginning at the determined time of contact. In this example or any other example, a length of the time interval varies based on the one or more conditions. In this example or any other example, the one or more conditions include an indication of a two-dimensional location of the contact on the surface of the display device. In this example or any other example, the microphone system includes at least two differently-located microphones configured to receive sound, and the selective attenuation is applied differently at each of those microphones based on them being differently located. In this example or any other example, the one or more conditions include an indication of one or more identifying characteristics of the input object. In this example or any other example, the one or more identifying characteristics of the input object describe one or more of a structure of the input object, a brand of the input object, and an operative end of the input object. In this example or any other example, the one or more conditions include an indication of a speed of the input object. In this example or any other example, the selective attenuation is further selected based on an identity of a user of the display device. In this example or any other example, the instructions are further executable to, based on one or more conditions detected for a series of touch events between the input object and the display device, progressively develop a custom selective attenuation for the input object. In this example or any other example, applying the selective attenuation includes applying frequency-dependent gain to the sound received into the microphone system. In this example or any other example, the sensing subsystem includes a contact sensor configured to detect contact between the input object and the surface of the display device. In this example or any other example, the input object is a stylus including a three sensor configured to measure a force of the contact between the input object and the surface of the display device, and the force measured by the force sensor is included in the one or more conditions.

In an example, a method for attenuating sound comprises: detecting, via a si using subsystem, one or more conditions associated with touch input to a display device occurring via a contact between an input object and a surface of the display device; determining a time of the contact based on the one or more conditions; determining sonic characteristics of the contact based on the one or more conditions; receiving sound via a microphone system; and generating an audio output via applying a selective attenuation to process sound received into the microphone system, the selective attenuation being selected based on the sonic characteristics and applied over a time interval beginning the determined time of contact. In this example or any other example, a length of the time interval varies based on the one or more conditions. In this example or any other example, the one or more conditions include an indication of a two-dimensional location of the contact on the surface of the display device. In this example or any other example, the microphone system includes at least two differently-located microphones configured to receive sound, and the selective attenuation is applied differently at each of those microphones based on them being differently located. In this example or any other example, the one or more conditions include an indication of a speed of the input object. In this example or any other example, applying the selective attenuation includes applying frequency-dependent gain to the sound received into the microphone system.

In an example, a display device comprises; a sensing subsystem configured to detect one or more conditions associated with touch input to the display device occurring via a contact of an kaput object at a surface of the display device, the one or more conditions indicating at least a two-dimensional location of the contact on the surface of the display device microphone system configured to receive sound; a logic machine; and a storage machine holding instructions executable by the logic machine to: determine, based on the one or more conditions, a time of the contact; determine, based on the one or more conditions, sonic characteristics of the contact; and generate an audio output via applying a selective attenuation to process sound received into the microphone system, the selective attenuation being selected based on the sonic characteristics and applied over a time interval beginning at the determined slime of contact, a length of the time interval varying based on the one or more conditions. In this example or any other example, the one or more conditions include an indication of a speed of the input object.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be preformed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display device, comprising:
  a sensing subsystem configured to detect one or more conditions associated with touch input to the display device;
  a microphone system configured to receive sound;
  a logic machine; and
  a storage machine holding instructions executable by the logic machine to:
    predict, based on a speed of an input object as sensed by the sensing subsystem, that a contact of an input object at a surface of the display device will occur in the future at a predicted time of contact;
    predict, based on the one or more conditions, sonic characteristics of the contact, where such prediction is made via reference to a varying association between sets of the one or more conditions and associated sonic characteristics that varies during real-time operation of the display device;
    detect a series of touch events between the input object and the display device;
    detect a series of sounds via the microphone system;
    based on empirically observing at least one of the one or more conditions detected in association with one or more touch events from the series of touch events and one or more sounds from the series of sounds, progressively develop a custom selective attenuation for the input object; and
    generate an audio output via applying the custom selective attenuation to process sound received into the microphone system, the custom selective attenuation being selected based on the sonic characteristics and applied over a time interval beginning at the predicted time of contact.

2. The display device of claim 1, where a length of the time interval varies based on at least one of the one or more conditions associated with touch input to the display device.

3. The display device of claim 1, wherein the one or more conditions associated with touch input to the display device include an indication of a two-dimensional location of the contact on the surface of the display device.

4. The display device of claim 1, wherein the microphone system includes at least two differently-located microphones configured to receive sound, and wherein the selective attenuation is applied differently at each of those microphones based on them being differently located.

5. The display device of claim 1, wherein the one or more conditions associated with touch input to the display device include an indication of one or more identifying characteristics of the input object.

6. The display device of claim 5, wherein the one or more identifying characteristics of the input object describe one or more of a structure of the input object, a brand of the input object, and an operative end of the input object.

7. The display device of claim 1, wherein the one or more conditions associated with touch input to the display device include an indication of a speed of the input object prior to contacting the surface of the display device.

8. The display device of claim 1, wherein the selective attenuation is further selected based on an identity of a user of the display device.

9. The display device of claim 1, wherein applying the selective attenuation includes applying frequency-dependent gain to the sound received into the microphone system.

10. The display device of claim 1, where the sensing subsystem includes a contact sensor configured to detect contact between the input object and the surface of the display device.

11. The display device of claim 1, where the input object is a stylus including a force sensor configured to measure a force of the contact between the input object and the surface of the display device, and the force measured by the force sensor is included in the one or more conditions.

12. A method for attenuating sound, comprising:
    detecting, via a sensing subsystem, one or more conditions associated with touch input to a display device, the one or more conditions including a description of one or more of a structure of an input object, a brand of an input object, and an operative end of the input object;
    predicting, based on a speed of an input object as sensed by the sensing subsystem, that a contact of an input object at a surface of the display device will occur in the future at a predicted time of contact;
    predicting sonic characteristics of the contact based on the one or more conditions, where such prediction is made via reference to a varying association between sets of the one or more conditions and associated sonic characteristics that varies during real-time operation of the display device;
    receiving sound via a microphone system; and
    generating an audio output via applying a selective attenuation to process sound received into the microphone system, the selective attenuation being selected based on the sonic characteristics and applied over a time interval beginning at the predicted time of contact.

13. The method of claim 12, where a length of the time interval varies based on the one or more conditions.

14. The method of claim 12, wherein the one or more conditions include an indication of a two-dimensional location of the contact on the surface of the display device.

15. The method of claim 12, wherein the microphone system includes at least two differently-located microphones configured to receive sound, and wherein the selective attenuation is applied differently at each of those microphones based on them being differently located.

16. The method of claim 12, wherein the one or more conditions include an indication of the speed of the input object.

17. The method of claim 12, wherein applying the selective attenuation includes applying frequency-dependent gain to the sound received into the microphone system.

18. A display device, comprising:
    a sensing subsystem configured to detect one or more conditions associated with touch input to the display device, the one or more conditions indicating at least: 1) a two-dimensional location of a contact on a surface of the display device, and 2) a description of one or more of a structure of an input object, a brand of an input object, and an operative end of the input object;
    a microphone system configured to receive sound;
    a logic machine; and
    a storage machine holding instructions executable by the logic machine to:
        predict, based on a speed of an input object as sensed by the sensing subsystem, that a contact of an input object at a surface of the display device will occur in the future at a predicted time of contact;
        predict, based on the one or more conditions, sonic characteristics of the contact, where such prediction is made via reference to a varying association between sets of the one or more conditions and associated sonic characteristics that varies during real-time operation of the display device; and
        generate an audio output via applying a selective attenuation to process sound received into the microphone system, the selective attenuation being selected based on the sonic characteristics and applied over a time interval beginning at the predicted time of contact, a length of the time interval varying based on the one or more conditions.

19. The display device of claim 18, wherein the one or more conditions include an indication of the speed of the input object.

* * * * *